United States Patent
Engelkemier et al.

(10) Patent No.: US 11,665,001 B1
(45) Date of Patent: May 30, 2023

(54) NETWORK SECURITY USING ROOT OF TRUST

(71) Applicant: Ethernovia Inc., San Jose, CA (US)

(72) Inventors: Darren S. Engelkemier, Menlo Park, CA (US); Roy T. Myers, Jr., Santa Clara, CA (US); Poon-Kuen Leung, Fremont, CA (US); Hossein Sedarat, San Jose, CA (US); Ramin Shirani, Morgan Hill, CA (US)

(73) Assignee: Ethernovia Inc., San Jose, CA (US)

( * ) Notice: Subject to any disclaimer, the term of this patent is extended or adjusted under 35 U.S.C. 154(b) by 456 days.

(21) Appl. No.: 16/788,158

(22) Filed: Feb. 11, 2020

Related U.S. Application Data

(60) Provisional application No. 62/804,600, filed on Feb. 12, 2019.

(51) Int. Cl.
*H04L 9/32* (2006.01)
*G06F 21/57* (2013.01)
(Continued)

(52) U.S. Cl.
CPC .......... *H04L 9/3247* (2013.01); *G06F 21/575* (2013.01); *H04L 9/30* (2013.01);
(Continued)

(58) Field of Classification Search
CPC ....... H04L 9/3247; H04L 9/30; H04L 63/164; H04L 63/20; H04L 67/12; G06F 21/575; G06F 2221/031
See application file for complete search history.

(56) References Cited

U.S. PATENT DOCUMENTS

| | | | | |
|---|---|---|---|---|
| 2010/0205429 | A1* | 8/2010 | Alrabady | H04L 63/0823 713/156 |
| 2014/0359268 | A1* | 12/2014 | Jauhiainen | G06F 21/44 713/168 |
| 2017/0272943 | A1* | 9/2017 | Valasek | G06F 21/575 |

FOREIGN PATENT DOCUMENTS

| | | | | |
|---|---|---|---|---|
| CN | 106603483 | A * | 4/2017 | G06F 21/575 |
| CN | 104572320 | B * | 9/2018 | G06F 11/1433 |

OTHER PUBLICATIONS

"Securing Vehicle Electronic Control Unit (ECU) Communications and Stored Data"—Swawibe UI Alam, M.D., Queen's University, Sep. 2018 https://qspace.library.queensu.ca/bitstream/handle/1974/24854/Alam_Md_Swawibe_UI_201809_MSC.pdf (Year: 2018).*

(Continued)

*Primary Examiner* — Randy A Scott
(74) *Attorney, Agent, or Firm* — Schwegman Lundberg & Woessner, P.A.

(57) ABSTRACT

Disclosed are systems, methods, and non-transitory computer-readable media for network security using Root of Trust (RoT). A node in the vehicle networking system receives an authentication message from an adjacent node in the vehicle networking system. The authentication message included identifying information of the adjacent node that is digitally signed with a digital signature having been generated using a private key. The adjacent node accessed the identifying information of the second node from a source image authenticated during a secure boot of the adjacent node. The node accesses a public key available to the node and authenticates the adjacent node based on the public key and the digital signature included in the authentication message.

20 Claims, 13 Drawing Sheets

(51) Int. Cl.
  *H04L 9/30* (2006.01)
  *H04L 9/40* (2022.01)
  *H04L 29/06* (2006.01)
  *H04L 29/08* (2006.01)
  *H04L 67/12* (2022.01)

(52) U.S. Cl.
  CPC ............ *H04L 63/164* (2013.01); *H04L 63/20* (2013.01); *G06F 2221/031* (2013.01); *H04L 67/12* (2013.01)

(56) References Cited

OTHER PUBLICATIONS

"Securing Vehicle Electronic Control Unit (ECU) Communications and Stored Data"—Swawibe UI Alam, M.D., Queen's University, Sep. 2018 http://personales.upv.es/thinkmind/dl/conferences/icns/icns_2016/icns_2016_2_30_10045.pdf (Year: 2018).*

* cited by examiner

NETWORK SECURITY USING ROOT OF TRUST

CROSS-REFERENCE TO RELATED APPLICATIONS

The present application claims the benefit of priority of U.S. Provisional Application No. 62/804,600, filed on Feb. 12, 2019, which is incorporated herein by reference in its entirety.

TECHNICAL FIELD

An embodiment of the present subject matter relates generally to network security, and more specifically, to network security using root of trust.

BACKGROUND

Modern vehicles include many computer managed features. For example, vehicles include computers that monitor and/or control engine emissions, tire pressure, throttle position, engine temperature, spark plugs, fuel injection, automatic transmission, anti-lock brakes, automated driving, keyless entry, climate control, motorized seats and mirrors, entertainment systems (e.g., radio, compact disk player), cruise control, etc. To provide these computer managed features, vehicles are equipped with a network of linked nodes (e.g., vehicle networking system) that communicate with each other at the data link layer (e.g., via data communication links). For example, a vehicle may include multiple sensors that continuously gather sensor data and provide the sensor data to computers (e.g., Electronic Control Unit (ECU)) included in the vehicle via data links. In turn, each computer analyzes the received sensor data and provides control commands to actuators and/or output devices as needed to provide the computer managed feature.

Providing a secure network within a vehicle is important to ensure that the functioning of these computer managed features cannot be tampered with or manipulated by an outside entity. This is of particular importance when providing mission critical features, such as driver assisted functions to full autonomous driving, which could lead to catastrophe if manipulated by a bad actor. Current Root of Trust (RoT) approaches provide security for individual nodes in a network by ensuring that only trusted and authenticated software code is loaded and executed by the node upon power-up or reset. However, the current approach does not allow a secure node to authenticate another node to ensure that network data being received by the secure node over a communication data link (e.g., at the data link layer) is from a trusted source. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
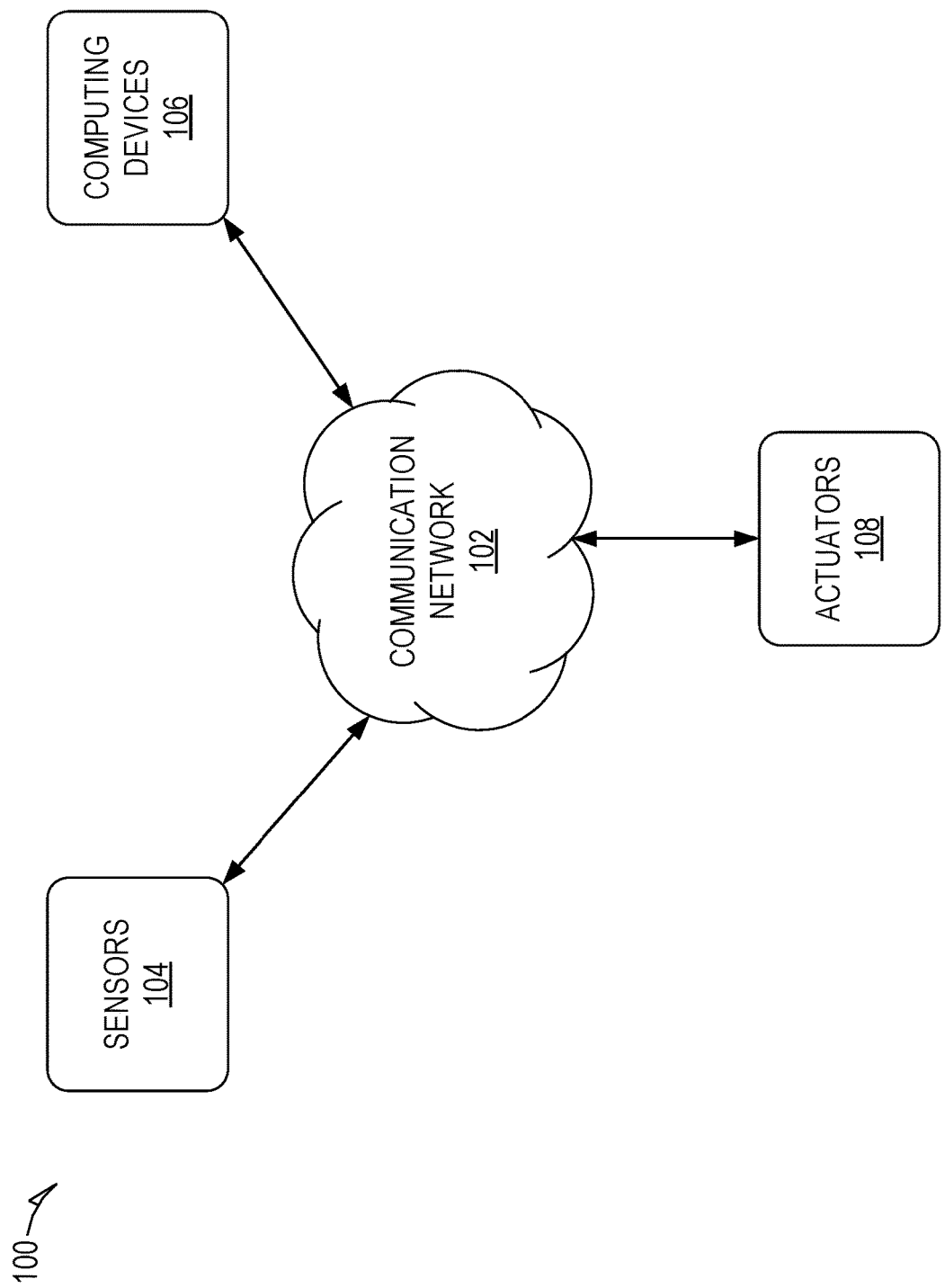
FIG. 1 shows a vehicle networking system, according to certain example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for network security using RoT. Current RoT approaches secure individual computing nodes in a network by ensuring that only trusted and authenticated software code is loaded and executed by the computing node upon power-up or reset of the computing node. For example, a private/public key pair is used to ensure that the software being loaded by the computing node is trusted and authenticated software code. A manufacturer or other trusted entity uses the private key to digitally sign a software image used during a secure boot of the computing node. The digitally signed software image may include multiple software components to be executed by the computing node, such as an Operating System (OS) loader, OS, Applications, and the like.

The corresponding public key is stored in a One Time Programmable (OTP) memory of the computing node. The OTP memory is a non-volatile memory that permits data to be written to the memory only once, after which the contents of the memory do not change, even if a reset or power cycle occurs. During a secure boot, the computing node accesses the public key stored in its OTP memory and uses the public key to verify the digital signature used to sign the software image, thereby authenticating that the software code is trusted.

As the authenticated software image is deemed trusted, the data included in the software image is also trusted and can therefore be used to authenticate adjacent computing nodes in the network. For example, the authenticated software image can contain a software component including identifying information that is digitally signed using a private key. The computing node may include this software component in an authentication message transmitted to an adjacent computing node in the network to authenticate itself to the adjacent computing node. The identifying information may be digitally signed using the same private key used to digitally sign the software image or a different private key.

The receiving computing node uses a corresponding public key to verify the digital signature included in the authentication message, thereby authenticating that the transmitting computing node is trusted. The public key may be stored in the OTP of the receiving node or, alternatively, the public key may be stored in a software image authenticated during a secure boot of the receiving computing device. As each software image is itself authenticated and deemed trusted, the data included in the software image can also be trusted. Accordingly, the software image may be used to store any number of digitally signed components and public keys used to authenticate the network. This authentication process may be performed across each source and destination link in the network, thereby providing a secure network.

FIG. 1 shows a vehicle networking system 100, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the vehicle networking system 100 to facilitate additional functionality that is not specifically described herein.

The vehicle networking system 100 is a collection of nodes distributed within a vehicle (e.g., automobile, airplane, ship, etc.), which are interconnected via a communication network 102. The communication network 102 comprises communication links and segments for transporting data between nodes, such as sensors 104, computing devices 106, and actuators 108. Each node in the vehicle networking system 100 may be a redistribution point or an endpoint that can receive, create, store or send data along distributed network routes. For example, each node, whether an endpoint or a redistribution point, can have either a programmed or engineered capability to recognize, process and forward data transmissions to other nodes in the vehicle networking system 100. While the vehicle networking system 100 shows only sensors 104, computing devices 106 and actuators 108, this is not meant to be limiting. The vehicle networking system 100 may include any of a variety of networking nodes, example of which include sensors 104, displays, actuators 108, computing devices 106, routers, switches, input devices, speakers, other output devices, etc.

The communication network 102 is implemented using any number of nodes and communications links, including one or more wired communication links, one or more wireless communication links, or any combination thereof.

Additionally, the communication network 102 is configured to support the transmission of data formatted using any number of protocols.

Multiple sensors 104, computing devices 106, and actuators 108 can be connected to the communication network 102. A computing device 106 is any type of general computing device capable of network communication with other computing devices. For example, a computing device 106 can include some or all of the features, components, and peripherals of the computing system 1300 shown in FIG. 13.

To facilitate communication with other computing devices 106, a computing device 106 includes a communication interface configured to receive a communication, such as a request, data, and the like, from another computing device 106 or sensor 104 in network communication with the computing device 106 and pass the communication along to an appropriate module running on the computing device 106. The communication interface also sends a communication to another computing device 106, actuator 108, and/or other node in network communication with the computing device 106.

The sensors 104 may be any type of sensors used to capture data. For example, the sensors 104 may include engine speed sensors, fuel temperature sensors, voltage sensors, pressure sensors, radar sensors, light detection and ranking (LIDAR) sensors, imaging sensors (e.g., camera, video camera), etc. The sensors 104 may capture data describing performance of a vehicle and its surroundings and provide the captured data to one or more of the computing devices 106 in the vehicle networking system 100.

The computing devices 106 use the captured sensor data to provide various computer managed features. For example, the computing devices 106 may use the gathered sensor data to monitor and/or control engine emissions, tire pressure, throttle position, engine temperature, spark plugs, fuel injection, automatic transmission, anti-lock brakes, automated driving, etc. The computing devices 106 may also use the gathered sensor data to provide non-critical luxury functions, such as keyless entry, climate control, motorized seats and mirrors, entertainment system (e.g., radio, compact disk player), cruise control, etc.

The actuators 108 are hardware components that are responsible for executing a mechanical/electrical action, such as moving and controlling a mechanism or system. Examples of actuators 108 include an on/off switch (e.g. door locks, lights, etc.), electric motors (e.g. side mirror, seat and steering wheel control), etc. The computing devices 106 transmit commands to the actuators 108 to perform a specified action. This category of network devices may also include any type of output devices that mostly consumes and/or outputs data, such as video displays and audio speakers.

As previously explained, the vehicle networking system 100 may be secured using RoT. For example, nodes in the vehicle networking system 100 execute a secure boot during which each node authenticates a digitally signed software image with a public key stored in the nodes respective OTP. The software image is digitally signed using a private key generated by a manufacturer or other trusted entity associated with the node.

Once the software image is authenticated, the node uses software components included in the software image to authenticate itself to adjacent nodes in the vehicle networking system 100. For example, the authenticated software image may include a component comprising identifying information that is digitally signed using a private key. The node includes this component in an authentication message, which is transmitted to adjacent nodes. The adjacent nodes use a corresponding public key to verify the digital signature and thereby authenticate the node. Similarly, the node may receive authentication messages from adjacent nodes and use a public key to verify the digital signature and uniquely authenticate the adjacent nodes. The public key may be stored in the OTP of the node or, alternatively, in the software image that is authenticated during the secure boot of the node.

Figure 2:
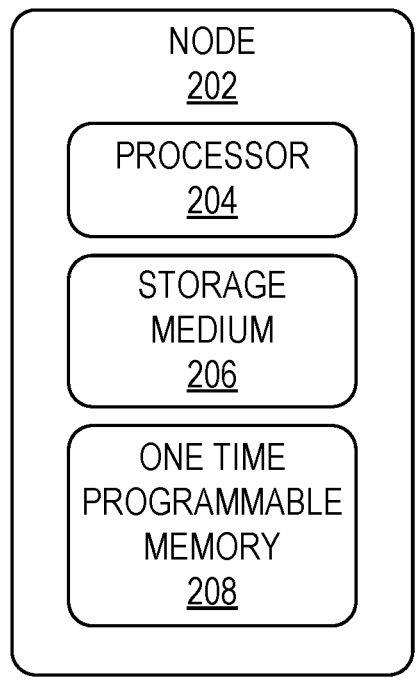
FIG. 2 is a block diagram of a node for providing network security using RoT, according to some example embodiments.

FIG. 2 is a block diagram of a node 202 for providing network security using RoT, according to some example embodiments. The node 202 may be included in any type of network of interconnected nodes, such as a vehicle networking system 100 shown in FIG. 1. The network may include any number of nodes 202 connected via network data links. For example, the node 202 may be connected to one or more adjacent nodes in the network via network data links, and each adjacent node may be connected to one or more other adjacent nodes. The network data links can be physical wires, optical connectors, wireless connections, or the like. The nodes in the network 200 may communicate using a network protocol, such as Ethernet, which uses packets to send information between nodes.

As shown, the node 202 includes a processor 204, a storage medium 206, and a OTP memory 208. The processor 204 is configured to execute a secure boot process to ensure that only trusted and authenticated software code is loaded and executed by the node 202 during power-up or reset of the node 202. For example, a private/public key pair is used to verify that the software being loaded by the node 202 is trusted and authenticated software.

A manufacturer or other trusted entity generates the private/public key pair and uses the private key to digitally sign a software image used during the secure boot of the node 202. The digitally signed software image may include multiple software components that are executed by the node 202 as part of the secure boot process. For example, the software image may include an OS loader, OS, Applications, other software components, and the like. The software image is stored in the storage medium 206 of the node 202, where it can be accessed by the processor 204 during a secure boot.

The corresponding public key is stored in the OTP memory 208 of the node 202. The OTP memory 208 is a non-volatile memory that permits data to be written to the memory only once, after which the contents of the memory do not change, even if a reset or power cycle occurs. During a secure boot, the processor 204 accesses the public key stored in its OTP memory 208 and uses the public key to verify the digital signature used to sign the software image stored in the storage medium 206, thereby authenticating that the software image and its included components are trusted. Accordingly, the processor 204 may execute the software components included in the authenticated software image.

As the authenticated software image is deemed trusted, the data included in the software image is also trusted and can therefore be used to authenticate other nodes in the network that are adjacent to the node 202. For example, the authenticated software image can contain a software component including identifying information that is digitally signed using a private key. The node 202 may include this software component in an authentication message transmitted to an adjacent computing node in the network to authenticate itself to the adjacent node. The identifying information may be digitally signed using the same private key used to digitally sign the software image or a different private key.

An adjacent node that receives an authentication message uses a corresponding public key to verify the digital signature included in the authentication message, thereby authenticating that the node 202 from which the authentication message is received (e.g., the source node) is trusted.

The public key may be stored in an OTP of the adjacent node or, alternatively, the public key may be stored in a software image authenticated during a secure boot of the adjacent node. As each software image is itself authenticated and deemed trusted, the data included in the software image can also be trusted. Accordingly, the software image may be used to store any number of digitally signed components and public keys used to authenticate the network. This authentication process may be performed across each source and destination link in a network, thereby providing a secure network.

In addition to authenticating the nodes 202 in the network, security of the network may be further enhanced by securing the network data links that connect the authenticated nodes 202. For example, network data security tools, such as Media Access Control Security (MACsec) and IP Security (IPSec), that provide for secure communications on network data links and/or data paths may be used to secure the data links once the nodes 202 have been authenticated. MACsec provides for authentication and encryption of traffic over Ethernet on Layer 2 LAN networks, while IPSec provides similar functionality for Layer 3 networks, IPSec is used.

Network data security tools have traditionally been limited to use in traditional computing networks, but their use could be extended to implementation within a vehicle networking system 100. For example, the network data security tools may be used within a vehicle networking system 10 along with the network RoT technique described the present disclosure to provide for authentication of the nodes 202 and the network data links or paths within the vehicle networking system 100. The network data security tools may also be used within a vehicle networking system 100 with any other technique for authenticating the nodes 202 within the vehicle networking system 100.

Figure 3:
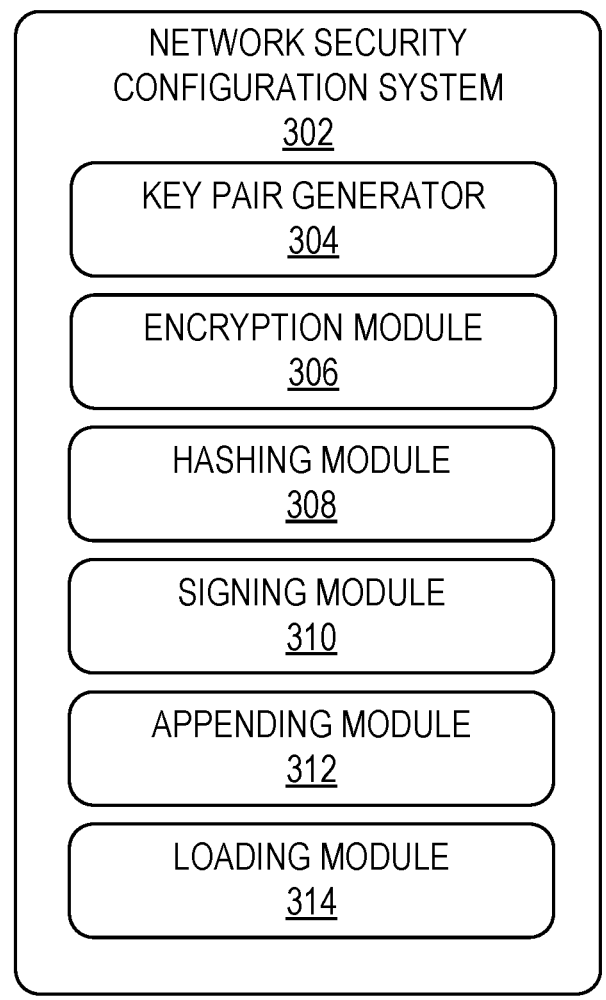
FIG. 3 is a block diagram of a network security configuration system, according to some example embodiments.

FIG. 3 is a block diagram of a network security configuration system 302, according to some example embodiments. The network security configuration system 302 may be comprised of one or more computing devices for configuring nodes 202 to providing network security using RoT. For example, the network security configuration system 302 enables the nodes 202 to initiate a secure boot, generate and transmit authentication messages to adjacent nodes, and authenticate authentication messages received from adjacent nodes.

As shown, the network security configuration system 302 includes a key pair generator 304, an encryption module 306, a hashing module 308, a signing module 310, an appending module 312, and a loading module 314.

The key pair generator 304 generates public/private key pairs for providing asymmetric cryptography. For example, the public key can be used to encrypt data, which can only be decrypted using the corresponding private key. Similarly, the private key may be used to digitally sign data, which can only be verified using the public key.

A single public/private key pair may be generated and used to digitally sign a software image that is used for a secure boot of multiple nodes. For example, the private key may be used to digitally sign the software image and the digitally signed software image and corresponding public key may be provided to multiple nodes 202. Alternatively, a unique public/private key pair may be generated and used to digitally sign the software image for each individual node 202.

The encryption module 306 encrypts data that is to be digitally signed using a private key. Encrypting data before it is digitally signed is an optional process that may be performed to increase the security of the digitally signed data. For example, the encryption module 306 can be used to encrypt a software image and/or software component included in a software image. The encryption module 306 may encrypt data using any known encryption method, such as by using symmetric cryptography in which a single key is used both for encryption and decryption of data.

The hashing module 308 generates a hash value for a given data input using a hashing algorithm. The hashing algorithm used by the hashing module 308 preferably outputs a unique output for each unique input, and also generates the same unique output each time the same unique input is used. The resulting hash values are fixed length output with a given variable length input making tampering with the input easily identifiable. An example hashing algorithm is Secure Hash Algorithm (SHA) such as SHA-256.

The signing module 310 generates a digital signature using a private key. For example, the signing module 310 generates the digital signature by using the private key to encrypt the hash value output by the hashing module 308.

The appending module 312 appends the digital signature generated by the signing module 310 to the corresponding input data provided to the hashing module 308 from which the digital signature was generated. For example, the appending module 312 may append the digital signature to a software image or software component used as input by the hashing module 308. Alternatively, the appending module 312 may append the digital signature to an encrypted version of the software image or software component that was generated by the encryption module 306 and subsequently used as input by the hashing module 308.

The loading module 314 loads public keys and/or software images for use in verifying data that has been digitally signed using a private key. The private key may be kept confidential by a manufacturer or other entity for security purposes. The public key, however, may be provided to various devices and/or entities to allow the devices and/or entities to authenticate data that has been digitally signed using the corresponding private key. That is, the public key is used to determine whether data (e.g., a source image or software component) was digitally signed using the private key corresponding to the public key. The loading module 314 may therefore store a public key in a OTP memory 208 of node 202. The OTP memory 208 is a non-volatile memory that permits data to be written to the memory only once, after which the contents of the memory do not change, even if a reset or power cycle occurs. Alternatively, the key storage module 314 may store the public key in a software image used during a secure boot of a node 202. The loading module 314 may store software image, whether including or not including a public key, in a storage medium 206 of a node.

In some embodiments, the network security configuration system 302 may configure a node 202 to manage a situation in which a private key is compromised. For example, the key pair generator 304 may generate multiple/private public key pairs for use in a secure boot. The multiple key pairs include a primary private/public key pair and any number of backup private/public key pairs which are used in the event that the primary private key is compromised. The loading module 314 may store multiple public keys in the OTP memory 208 of a node 202. The public keys stored in the OTP memory may be stored in a sequential manner such that the public key that is ordered first is utilized by the node for authentication purposes.

In the event that the primary private key is compromised, the network security configuration system 302 may generate updated software images for the nodes 202 using a secondary private key. The network security configuration system 302 may then remotely update the nodes 202 to replace the software images currently installed on the nodes 202 with the updated software images generated using the secondary private key. The network security configuration system 302 may also transmit a command to the nodes 202 to no longer use the primary public key stored in the OTP memory 208. As a result, each node 202 will begin to use the secondary public key that is ordered after the primary public key in the OTP memory 208. For example, each public key stored in the OTP memory 208 may correspond to an electronic fuse (e.g., eFuse) on the Application-specific integrated circuit (ASIC) and the electronic fuse corresponding to a public key may be blown to disable use of the public key by the node 202.

Figure 4:
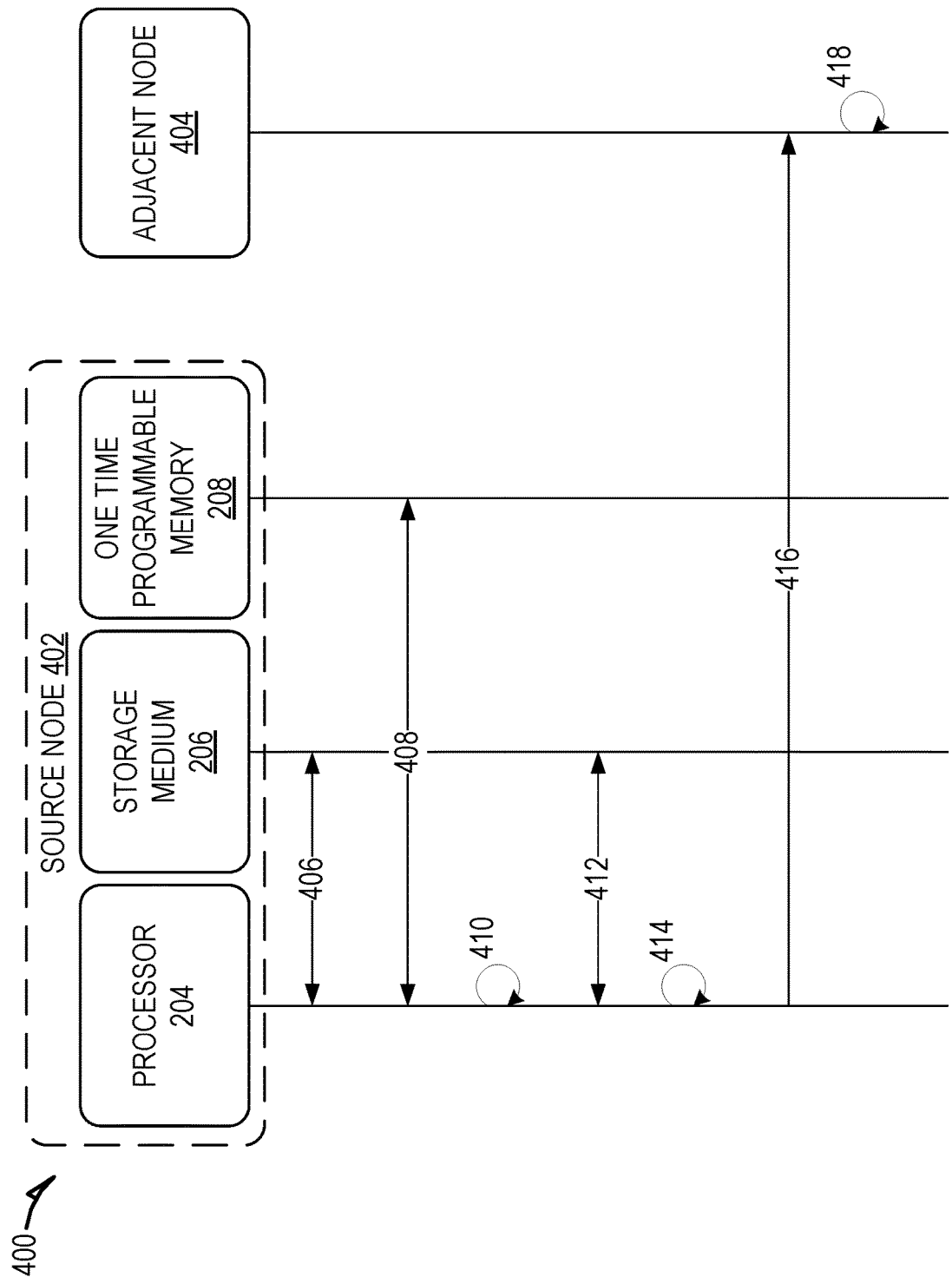
FIG. 4 is a sequence diagram for providing network security between adjacent nodes in a network using RoT, according to some example embodiments.

FIG. 4 is a sequence diagram for providing network security between adjacent nodes in a network 400 using RoT, according to some example embodiments. As shown, the network 400 includes a source node 402 and an adjacent node 404. During a secure boot of the source node 402, the processor 204 communicates 402 with the storage medium 206 to access a digitally signed software image appended with a digital signature that is stored in the storage medium 206.

The digital signature is generated by a network security configuration system 302 of a manufacturer or other trusted entity associated with the source node 402 using a private key. For example, the network security configuration system 302 generates a private/public key pair and digitally signs the software image using the private key. The private key is kept confidential by the manufacturer or other trusted entity for security purposes. The network security configuration system 302 generates the digital signature by using the private key to encode a hash value generated based on the software image. The resulting digital signature is then appended to the software image and stored in the storage medium 206 of the source node 402.

The network security configuration system 302 stores the public key corresponding to the private key in the OTP memory of the source node 402. The processor 204 may therefore communicate 408 with the OTP memory 208 to access the public key and perform a verification process 410 of the software image using the public key. For example, the processor 204 may verify the software image by using the public key to decrypt the digital signature appended to the software image, generating a hash value based on the software image, and determining whether the two resulting outputs match. Matching outputs indicate that the private key used to generate the digital signature corresponds to the public key. Accordingly, the processor 204 deems the software image as authenticated if the two resulting outputs match.

The software components included in an authenticated software image are deemed trusted and may therefore be safely executed by the processor 204. Accordingly, the processor 204 may communicate 412 with the storage medium 206 to access and execute 414 the software components included in the authenticated software image. For example, the software image may include an OS loader, OS, applications, and the like, which the processor 204 executes 414 to properly boot the source node 402.

The authenticated software image may also include a software component that allows the source node 402 to authenticate itself to an adjacent node 404 in the network 400. For example, the software component may include identifying information of the source node 402 appended with a digital signature. The identifying information of the source node 402 may include any type of uniquely identifying information, such as node, port, or address information. The digital signature may have been generated by the network security configuration system 302 of the manufacturer or a trusted entity associate with the source node 402. For example, the network security configuration system 302 may have generated the digital signature using the same private key used to digitally sign the software image or a different private key.

To verify the source node 402 to the adjacent node 404, the processor 204 includes the software component including the digitally signed identifying information in an authentication message 416, which is transmitted to the adjacent node 404. For example, the processor 204 may generate a data packet including the identifying information of the source node 402 appended with the digital signature. The authentication message 416 is transmitted to the adjacent node 404 to authenticate the source node 402 to the adjacent node 404.

Upon receiving the authentication message 416, the adjacent node 404 performs a verification process 418 of the authentication message 416 using a public key available to the adjacent node 404. For example, the public key may be stored in an OTP memory of the adjacent node or, alternatively, in a software image authenticated during a secure boot of the adjacent node 404. In either case, the adjacent node 404 uses the public key to verify that the digital signature appended to identifying information was generated using the private key corresponding to the public key. For example, the adjacent node 404 perform the process described below in relation to FIG. 11.

The source node 402 may authenticate itself to an adjacent node 404 as part of the secure boot process. For example, the source node 402 may automatically transmit authentication messages 416 to adjacent nodes 404 as part of the secure boot process of the source node 402, such as by transmitting the authentication messages 416 upon authenticating the software image. The source node 402 may also repeat this authentication process periodically thereafter to ensure that the source node 402 has not been tampered with after secure boot. For example, the source node 402 may transmit an authentication message 416 to an adjacent node 404 at any desired interval, such as predetermined time intervals and/or event based intervals, such as in response to specified events, or the like.

Although FIG. 4 shows the source node 402 transmitting an authentication message 416 to just one adjacent node 404, this is just for ease of explanation and is not meant to be limiting. The source node 402 may be connected to any number of adjacent nodes 404 in the network 400 and may therefore transmit authentication messages 416 to multiple adjacent node 404 to provide a secure network 400. Further, the authentication messages 416 transmitted by the source node 402 may vary based on the adjacent node 404 or type of adjacent node 404 to which the authentication message 416 is transmitted. For example, the authentication messages 416 may include different identifying information and/or have been digitally signed using different private keys. Accordingly, the various adjacent nodes 404 may have access to and use different public keys to perform the verification process on authentication messages 416 received from the source node 402.

While the source node 402 and adjacent node 404 are labeled differently, this too is for ease of explanation and is not meant to be limiting. The adjacent node 404 may also perform the functionality described in relation to the source node 402, such as by executing a secure boot and transmitting authentication messages to nodes that are adjacent to the adjacent node 404 (e.g., source node 402). Accordingly, each node in the network 400 may operate as a source node 402 when transmitting an authentication message to an adjacent node 404 to verify itself to the adjacent node 404. Similarly, each node in the network 400 may operate as an adjacent node 404 when verifying an authentication message to authenticate the source node 402 from which the authentication message was received.

Figure 5:
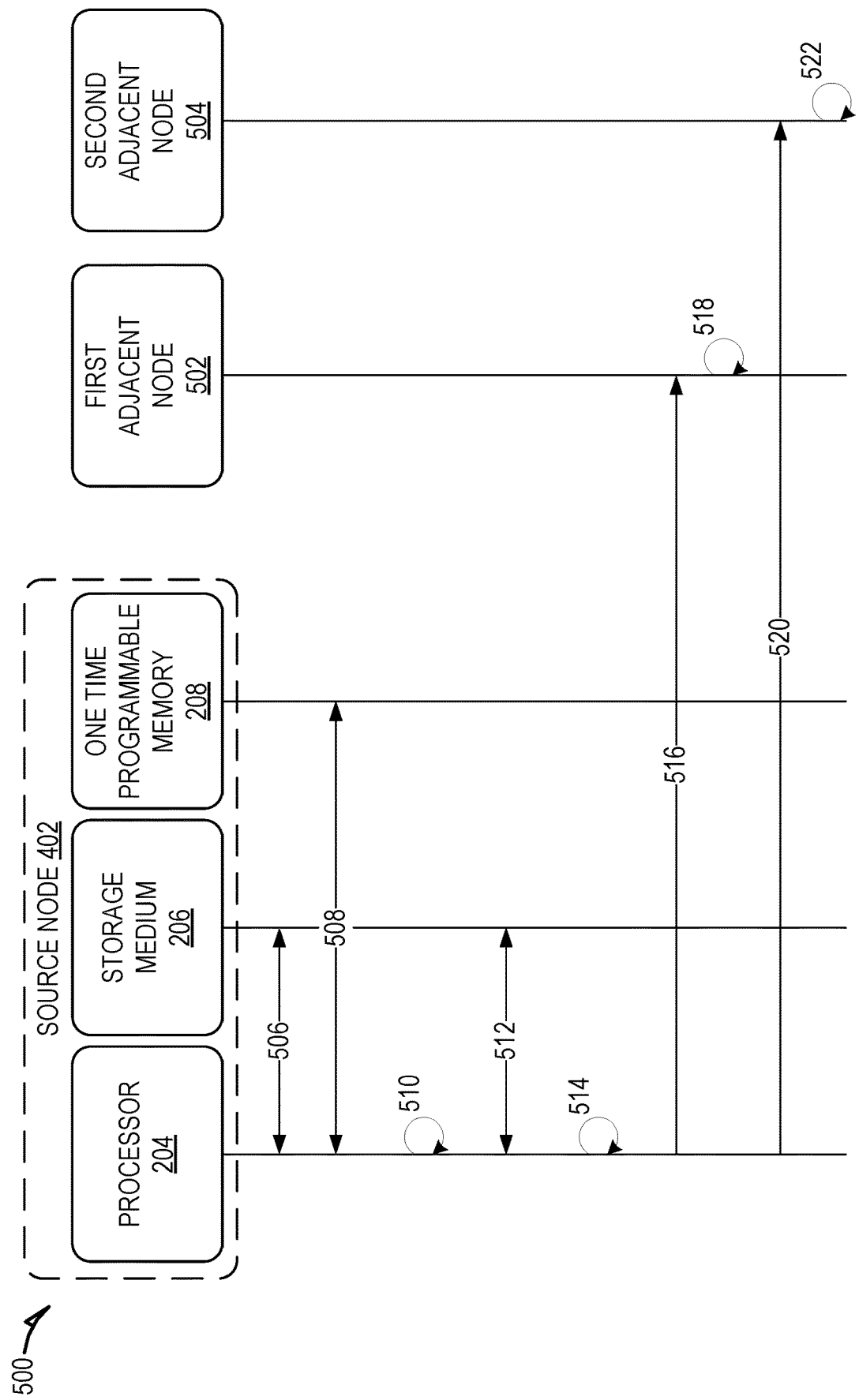
FIG. 5 is another sequence diagram for providing network security between adjacent nodes in a network using RoT, according to some example embodiments.

FIG. 5 is another sequence diagram for providing network security between adjacent nodes in a network 500 using RoT, according to some example embodiments. As shown, the network 500 includes a source node 402 connected to two adjacent nodes (e.g. the first adjacent node 502 and the second adjacent node 504). Although only two adjacent nodes 502, 504 are shown, this is just for ease of explanation and is not meant to be limiting. The network 500 may include any number of nodes and the source node 402 may be connected to any number of adjacent nodes 502, 504 via network data links. Further, each adjacent node 502, 504 may be connected to one or more other adjacent nodes.

During a secure boot of the source node 402, the processor 204 communicates 506 with the storage medium 206 to access a digitally signed software image stored in the storage medium 206. The digitally signed software image is appended with a digital signature that was generated using a private key. The processor 204 communicates 508 with the OTP memory 208 to access a public key and performs a verification process 510 of the software image using the public key. For example, the processor 204 uses the public key to decrypt the digital signature appended to the software image, generates a hash value based on the software image, and determines whether the two resulting outputs match.

The processor 204 deems the software image as authenticated if the two resulting outputs match. The software components included in an authenticated software image are deemed trusted and may therefore be safely executed by the processor 204. Accordingly, the processor 204 may communicate 428 with the storage medium 206 to access and execute 514 the software components included in the authenticated software image. For example, the software image may include an OS loader, OS, applications, and the like, which the processor 204 executes 30 to properly boot the source node 402.

The authenticated software image may also include software components that allow the source node 402 to authenticate itself to the first adjacent node 502 and the second adjacent node 504 in the network 400. For example, the software image may include a first software component that allows the source node 402 to authenticate itself to the first adjacent node 420, and a second software component that allows the source node 402 to authenticate itself to the second adjacent node 504. Both the first and second software components may include identifying information of the source node 402 appended with a digital signature, however, each of the digital signatures, may have been generated using different private key. Further, the public key corresponding to each private key may be provided to the appropriate adjacent node 502, 504. For example, the first adjacent node 502 may be given the public key corresponding to the private key used in relation to the first software component, and the second adjacent node 504 may be given the public key corresponding to the private key used in relation to the second software component.

To authenticate the source node 402 to the first adjacent node 502, the processor 204 includes the first software component in an authentication message 516 transmitted to the first adjacent node 502. For example, the processor 204 may generate a data packet including the digitally signed identifying information of the source node 402 that is included in the first software component. The authentication message 516 is transmitted to the first adjacent node 502 to authenticate the source node 402 to the first adjacent node 502.

Upon receiving the authentication message 516, the first adjacent node 502 performs a verification process 518 of the authentication message 516 using a public key available to the first adjacent node 502. For example, the public key may be stored in an OTP memory of the first adjacent node 502 or, alternatively, in a software image authenticated during a secure boot of the first adjacent node 502. As explained earlier, the public key provided to the first adjacent node 502 may be different than the public key provided to the second adjacent node 504. For example, the public key provided to the first adjacent node 502 may correspond to the private key used to digitally sign the identifying information included in the first software component. The first adjacent node 502 uses the public key to verify that the digital signature appended to identifying information included in the authentication message 414 was generated using the private key corresponding to the public key.

To authenticate the source node 402 to the second adjacent node 504, the processor 204 includes the second software component in another authentication message 520 that is transmitted to the second adjacent node 504. For example, the processor 204 may generate a data packet including the digitally signed identifying information of the source node 402 that is included in the second software component. The authentication message 520 is transmitted to the second adjacent node 504 to authenticate the source node 402 to the second adjacent node 504.

Upon receiving the authentication message 520, the second adjacent node 504 performs a verification process 522 of the authentication message 520 using a public key available to the second adjacent node 504. For example, the public key may be stored in an OTP memory of the second adjacent node 504 or, alternatively, in a software image authenticated during a secure boot of the second adjacent node 504. As explained earlier, the public key provided to the second adjacent node 504 may be different than the public key provided to the first adjacent node 502. For example, the public key provided to the second adjacent node 504 may correspond to the private key used to digitally sign the identifying information included in the second software component. The second adjacent node 504 uses the public key to verify that the digital signature appended to the identifying information included in the authentication message 520 was generated using the private key corresponding to the public key.

Figure 6:
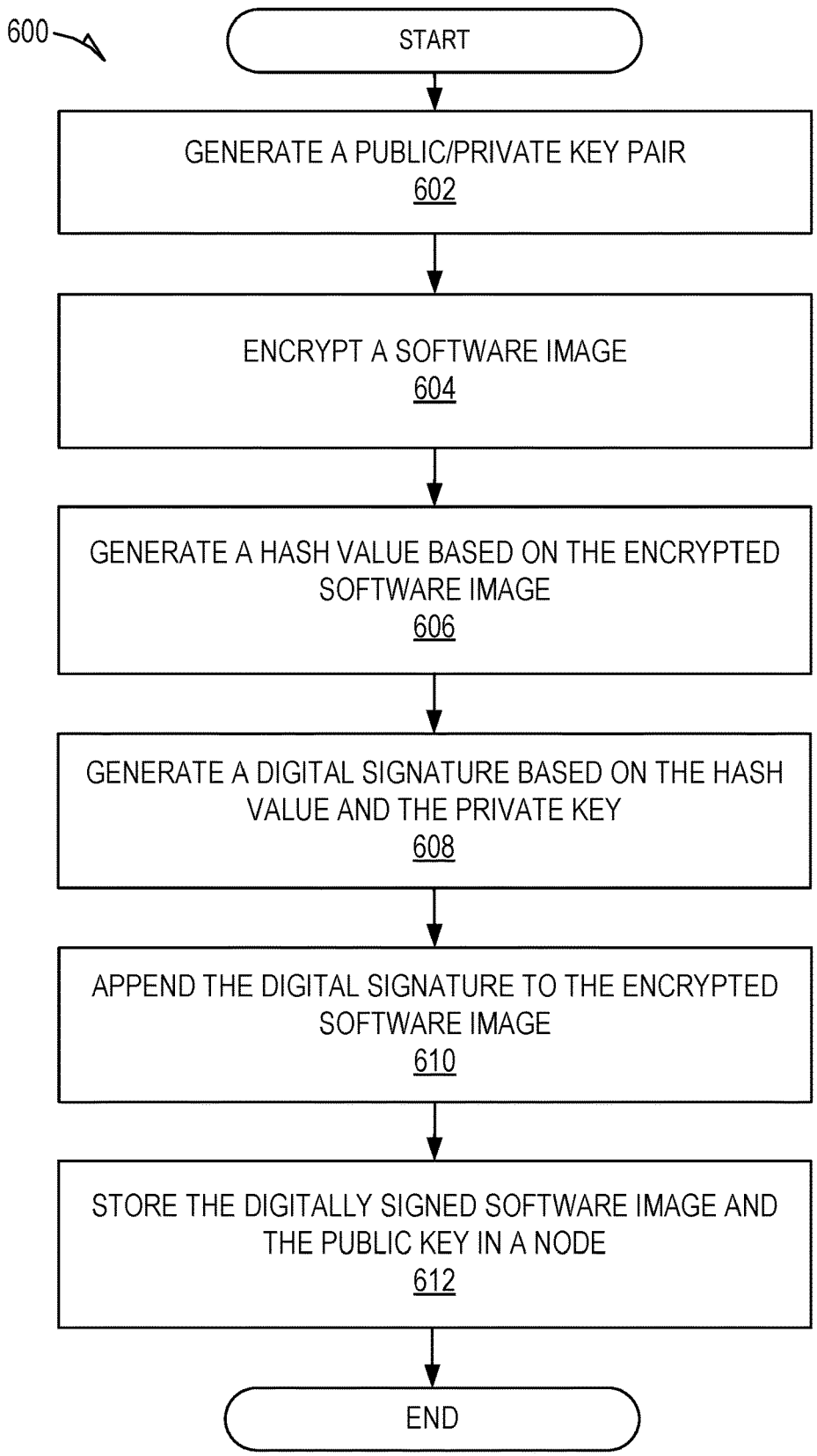
FIG. 6 is a flowchart showing a method of configuring a node to provide network security using RoT, according to some example embodiments.

FIG. 6 is a flowchart showing a method 600 of configuring a node to provide network security using RoT, according to some example embodiments. The method 600 may be embodied in computer readable instructions for execution by one or more processors such that the operations of the method 600 may be performed in part or in whole by a network security configuration system 302; accordingly, the method 600 is described below by way of example with reference to the network security configuration system 302. However, it shall be appreciated that at least some of the operations of the method 600 may be deployed on various other hardware and/or software configurations and the method 600 is not intended to be limited to the network security configuration system 302. For example, a combination of software and hardware may be used to accelerate any of the described functionality of the network security configuration system 302, such as encryption, hashing, digitally signing data, appending date, and the like.

At operation 602, the key pair generator 304 generates a public/private key pair. The key pair generator 304 generates public/private key pairs for providing asymmetric cryptography. For example, the public key can be used to encrypt data, which can only be decrypted using the corresponding private key. Similarly, the private key may be used to digitally sign data, which can only be verified using the public key.

At operation 604, the encryption module 306 encrypts a software image. The software image includes software components used by node 202 during a secure boot. For example, the software image may include an OS loader, OS, application, and the like. The software image may also include software component used to authenticate the node 202 to adjacent nodes 404, as well as to authenticate adjacent nodes 404. For example, the software components may include identifying information of the node 202 (e.g., node, port, address information, or the like) that has digitally signed by a private key. Further, the software components may include public keys that can be used to authenticate authentication messages received from adjacent nodes 404.

The encryption module 306 encrypts the software image prior to the software image being digitally signed using a private key. The encryption module 306 may encrypt data using any known encryption method, such as by using symmetric cryptography in which a single key is used both for encryption and decryption of data.

Encrypting the software image is an optional process that may be performed to increase the security of the digitally signed data. Accordingly, in some embodiments, the method 600 does not include operation 604. In these type of embodiments, operation 606 is performed based on an unencrypted version of the software image, rather than an encrypted version of the software image, as shown in method 600.

At operation 606, the hashing module 308 generates a hash value based on the encrypted software image. Alternatively, the hashing module 308 generates the hash value based on an unencrypted version of the software image in embodiments in which the software image is not encrypted. The hashing module 308 generates a hash value for a given data input using a hashing algorithm. The hashing algorithm used by the hashing module 308 preferably outputs a unique output for each unique input, and also generates the same unique output each time the same unique input is used. The resulting hash values are fixed length output with a given variable length input making tampering with the input easily identifiable. An example hashing algorithm is Secure Hash Algorithm (SHA) such as SHA-256.

At operation 608, the signing module 310 generates a digital signature based on the hash value and the private key. For example, the signing module 310 generates the digital signature by using the private key to encrypt the hash value output by the hashing module 308.

At operation 610, the appending module 312 appends the digital signature to the encrypted software image. Alternatively, in embodiments in which the software image is not encrypted, the appending module 312 appends the digital signature to an unencrypted version of the software image. Operation 610 results in a digitally signed version of the software image.

At operation 612, the loading module 314 stores the digitally signed software image and the public key in the node 202. For example, the loading module 314 stores the digitally signed software image in the storage medium 206 of a node 202, and the public key in an OTP programmable memory 208 of a node 202.

Figure 7:
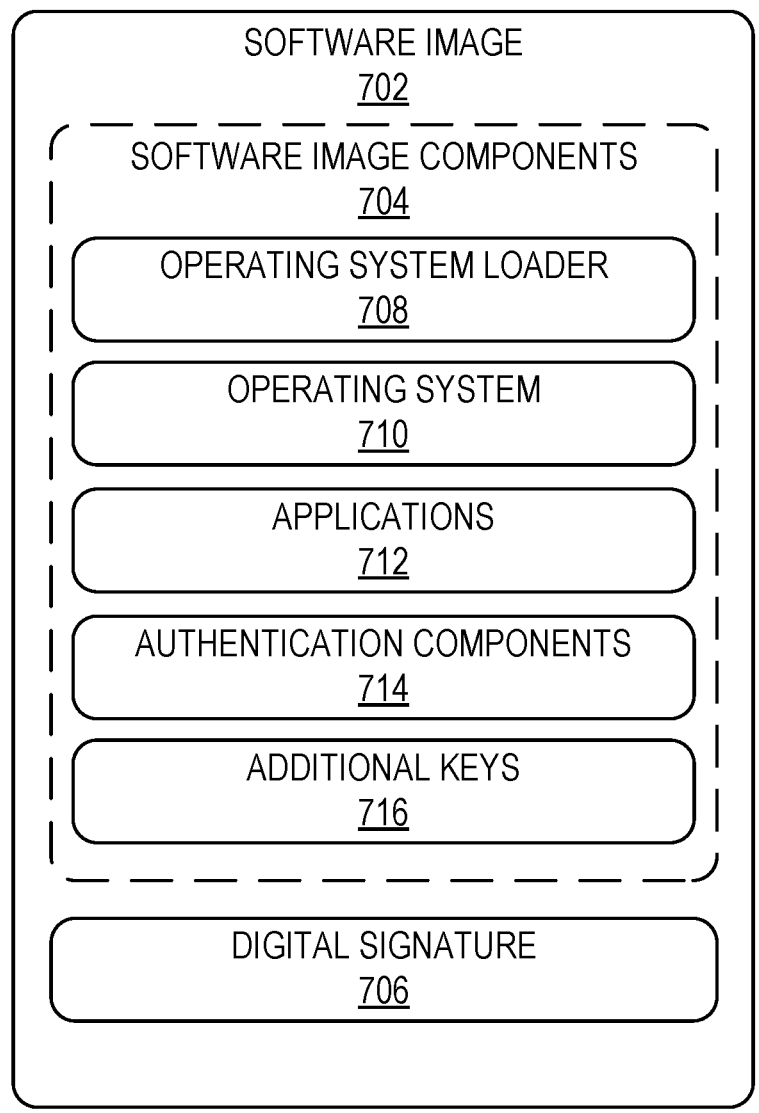
FIG. 7 is block diagram of a software image for providing network security using RoT, according to some example embodiments.

FIG. 7 is block diagram of a software image for providing network security using RoT, according to some example embodiments. As shown, the software image 702 includes software image components 704 and a digital signature 706. The software image components 704 may be encrypted or unencrypted, depending on the embodiment. The software components are digitally signed using a private key that was used to generate the digital signature 706. That is, the digital signature 706 is generated by using the provide key to encode a hash value generated from an encrypted or unencrypted version of the software image components.

A node 202 may use a public key to verify the digital signature, thereby authenticating that the software is trusted. If authenticated, the software components 704 included in the software image 702 are also deemed trusted and may be executed by the node. As shown, the software components 704 include an OS loader 708, OS 710, and applications 712, which the node 202 may execute to properly boot the node.

The software image components 704 also include components used to secure the network by authenticating the node 202 to other adjacent nodes 404, as well as to authenticate adjacent nodes 404. For example, the software image components 704 include authentication components 714, which can be used to authenticate the node 202 to adjacent nodes 404. The authentication components 714 may include identifying information that is digitally signed using a private key. The node 202 may generate an authentication message including the digitally signed identifying information and transmit the authentication message to an adjacent node 404 to authenticate the node 202 to the adjacent node 404. In turn, the adjacent node 404 may use a public key to authenticate the node 202 by verifying that a digital signature appended to the identifying information was generated using a private key corresponding to the public key available to the adjacent node 404.

The software image components 704 may include any number of the authentication components 714. Further, each authentication component 714 may be digitally signed using a different private key. Accordingly, each authentication component 714 may be specific to a particular adjacent node 404 or type of adjacent node 404.

The software image components 704 may also include any number of additional keys 716, which may include additional public keys, private keys, derivative private keys, and the like. The additional keys 716 may be stored in the software image 702 for use authorizing authentication messages received by the node 202 from adjacent nodes 404. In some embodiments, however, the additional keys 716 included in the software image components 704 do not include any public keys. In these types of embodiments, the public key used by the node to authenticate adjacent nodes 404 may be stored in an OTP memory 208 of the node 202.

Figure 8:
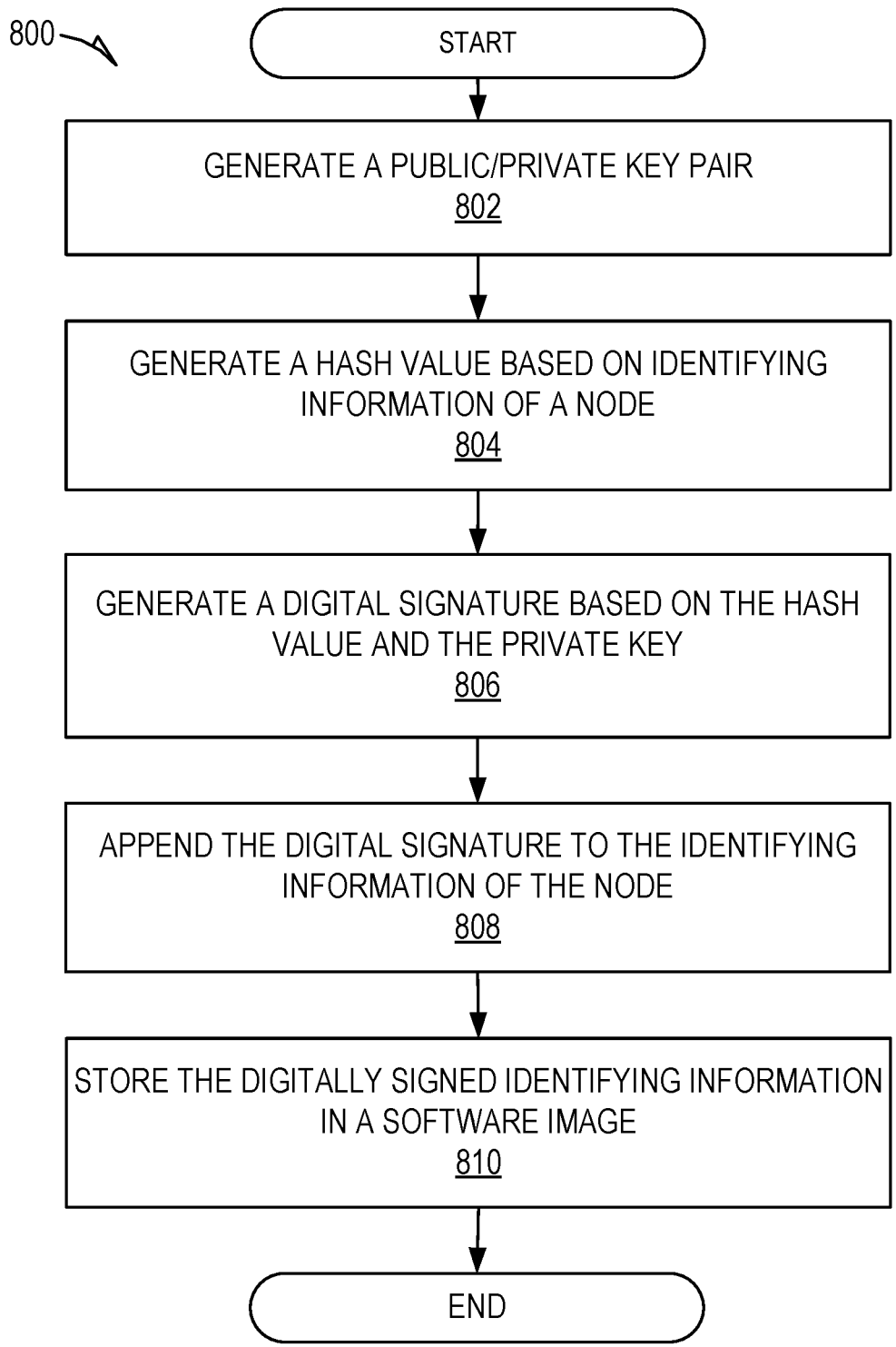
FIG. 8 is a flowchart showing a method of generating a software component providing network security between adjacent nodes in a network using RoT, according to some example embodiments.

FIG. 8 is a flowchart showing a method 800 of generating a software component providing network security between adjacent nodes in a network using RoT, according to some example embodiments. The method 800 may be embodied in computer readable instructions for execution by one or more processors such that the operations of the method 800 may be performed in part or in whole by a network security configuration system 302; accordingly, the method 800 is described below by way of example with reference to the network security configuration system 302. However, it shall be appreciated that at least some of the operations of the method 700 may be deployed on various other hardware configurations and the method 800 is not intended to be limited to the network security configuration system 302.

At operation 802, the key pair generator 304 generates a public/private key pair. The key pair generator 304 generates public/private key pairs for providing asymmetric cryptography. For example, the public key can be used to encrypt data, which can only be decrypted using the corresponding private key. Similarly, the private key may be used to digitally sign data, which can only be verified using the public key.

At operation 804, the hashing module 308 generates a hash value based on identifying information of a node 202. The identifying information may include any type of uniquely identifying information of node 302, such as node, port, or address information.

The hashing module 308 generates a hash value for a given data input using a hashing algorithm. The hashing algorithm used by the hashing module 308 preferably outputs a unique output for each unique input, and also generates the same unique output each time the same unique input is used. The resulting hash values are fixed length output with a given variable length input making tampering with the input easily identifiable. An example hashing algorithm is Secure Hash Algorithm (SHA) such as SHA-256.

In some embodiments, the identifying information is encrypted prior to the hashing module 308 generating the hash value. For example, the identifying information may be encrypted by the encryption module 306, which provides the encrypted identifying information to the hashing module 308. The encryption module 306 may encrypt the identifying information using any known encryption method, such as by using symmetric cryptography in which a single key is used both for encryption and decryption of data.

Alternatively, the identifying information is not encrypted prior to the hashing module 308 generating the hash value. Accordingly, the hashing module 308 generates the hash value based on an unencrypted version of the identifying information.

At operation 806, the signing module 310 generates a digital signature based on the hash value and the private key. For example, the signing module 310 generates the digital signature by using the private key to encrypt the hash value output by the hashing module 308.

At operation 808, the appending module 312 appends the digital signature to the identifying information of the node. For example, the appending module 312 appends the digital signature to the identifying information used as input by the hashing module 308. Accordingly, the appending module 312 may appends the digital signature to an unencrypted version of the identifying information in embodiments in which the identifying information is not encrypted prior to being digitally signed key. Alternatively, the appending module 312 appends the digital signature to an encrypted version of the identifying information in embodiments in which the identifying information is encrypted prior to being digitally signed using the private key.

At operation 810, the loading module 314 stores the digitally signed identifying information in a software image. The software image may then be digitally signed using the same private key used to digitally sign the identifying information or, alternatively, a different private key. The digitally signed software image may be stored in a storage medium 206 of a node 202 for use during a secure boot of the node 202.

Figure 9:
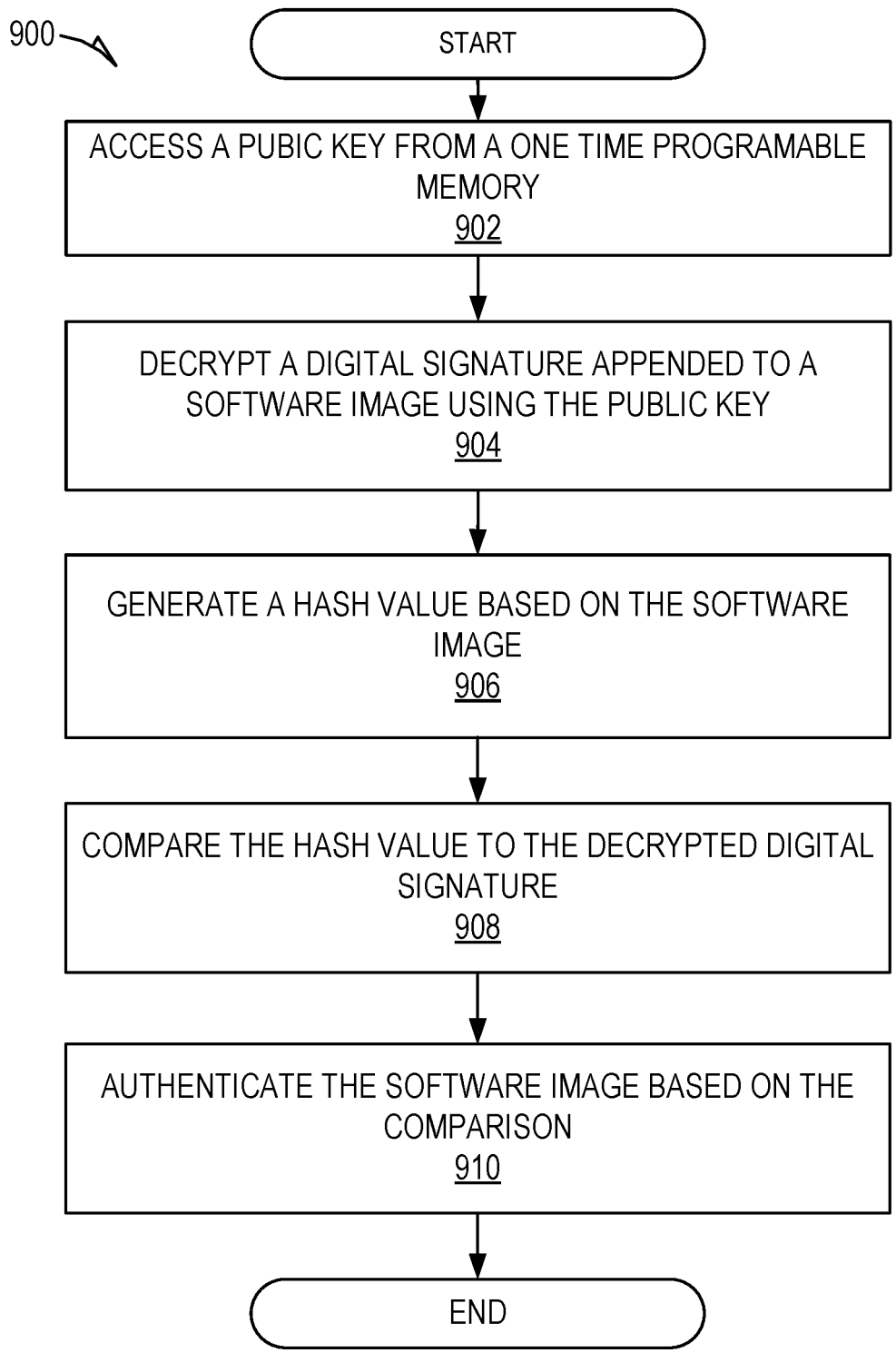
FIG. 9 is a flowchart showing a method of executing a secure boot, according to some example embodiments.

FIG. 9 is a flowchart showing a method 900 of executing a secure boot, according to some example embodiments. The method 900 may be embodied in computer readable instructions for execution by one or more processors such that the operations of the method 900 may be performed in part or in whole by a node 202 in a network; accordingly, the method 900 is described below by way of example with reference to a node 202. However, it shall be appreciated that at least some of the operations of the method 900 may be deployed on various other hardware configurations and the method 900 is not intended to be limited to a node 202.

At operation 902, the processor 204 accesses a public key from an OTP memory 208. The OTP memory 208 is a non-volatile memory that permits data to be written to the memory only once, after which the contents of the memory do not change, even if a reset or power cycle occurs. A network security configuration system 302 generates a public/private key pair and stores the public key in the OTP memory 208 for use in executing the secure boot. Specifically, the public key is provided to authenticate a software image as being trusted.

At operation 904, the processor 204 decrypts a digital signature appended to a software image using the public key. If the public key used to decrypt the digital signature corresponds to the private key used to generate the digital signature (e.g., the public key and the private key are a public/private key pair), the resulting decrypted digital signature will match the hash value used by the signing module 310 of the network security configuration system 302 when generating the digital signature. Alternatively, if the public key used to decrypt the digital signature does not correspond to the private key used to generate the digital signature, the resulting decrypted digital signature will not match the hash value used by the signing module 310 of the network security configuration system 302 when generating the digital signature.

At operation 906, the processor 204 generates a hash value based on the software image. For example, the processor 204 may use the software image as input in the same hashing algorithm used by the network security configuration system 302 that generated the digital signature. Using the software image as input in the hashing algorithm provides a hash value that matches the hash value used by the signing module 310 of the network security configuration system 302 when generating the digital signature.

At operation 908, the processor 204 compares the hash value to the decrypted digital signature. For example, the processor 204 compares the hash value to the decrypted digital signature to determine whether the hash value matches the decrypted digital signature.

At operation 910, the processor 204 authenticates the software image based on the comparison. For example, the processor 204 determines that the software image is authenticated and/or trusted when the comparison indicates that the hash value matches the decrypted digital signature. Alternatively, the processor 204 does not deem the software image as being authenticated when the hash value is determined to not match the decrypted digital signature.

Figure 10:
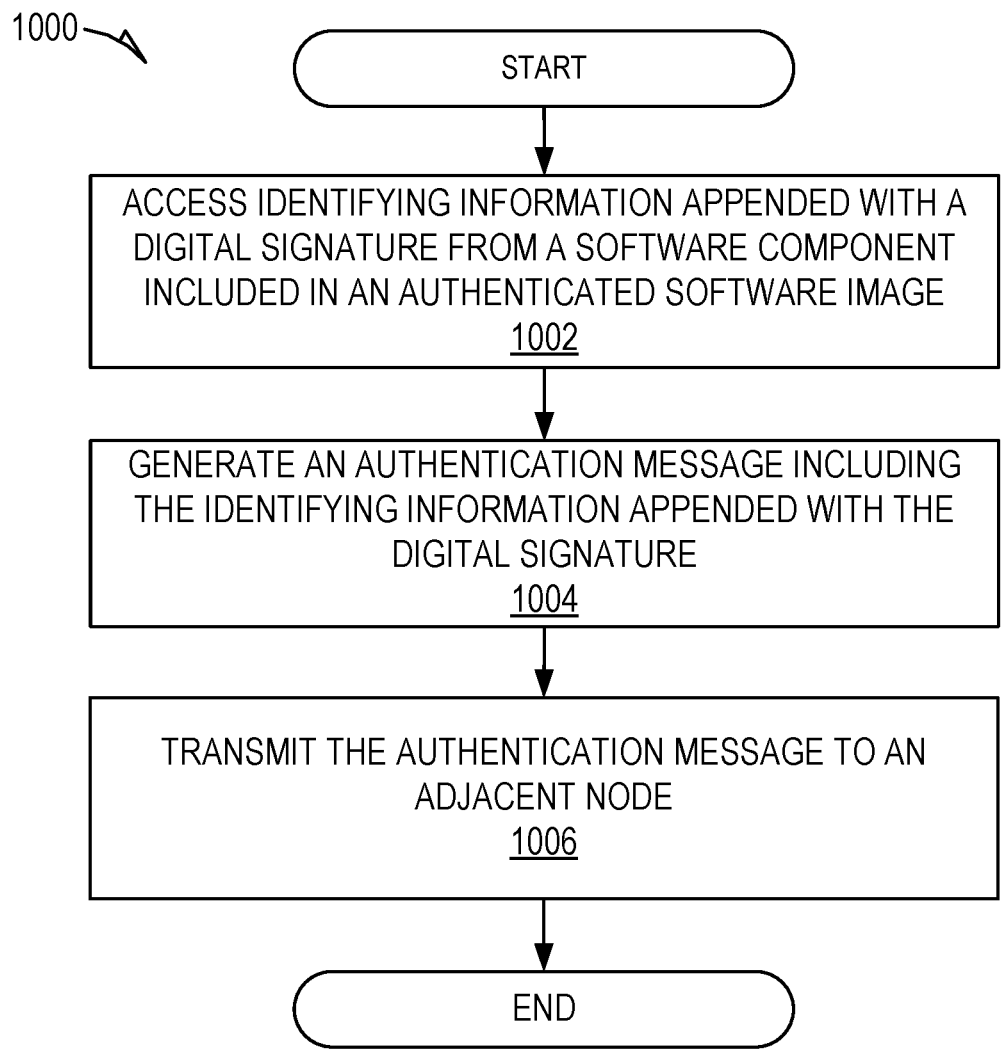
FIG. 10 is a flowchart showing a method of transmitting an authentication message to an adjacent node, according to some example embodiments.

FIG. 10 is a flowchart showing a method 1000 of transmitting an authentication message to an adjacent node 404, according to some example embodiments. The method 1000 may be embodied in computer readable instructions for execution by one or more processors such that the operations of the method 1000 may be performed in part or in whole by a source node 402; accordingly, the method 1000 is described below by way of example with reference to a source node 402. However, it shall be appreciated that at least some of the operations of the method 1000 may be deployed on various other hardware configurations and the method 1000 is not intended to be limited to a source node 402.

At operation 1002, the processor 204 accesses identifying information appended with a digital signature from a software component included in an authenticated software image. The identifying information may include any type of uniquely identifying information of the source node 402, such as node, port, or address information. The digital signature may have been generated by a network security configuration system 302 of the manufacturer or a trusted entity associate with the source node 402. For example, the network security configuration system 302 may have generated the digital signature using the same private key used to digitally sign the software image that includes the software component or, alternatively, a different private key.

At operation 1004, the processor 204 generates an authentication message including the identifying information appended with the digital signature. For example, the processor 204 may generate a data packet including the identifying information of the source node 402 appended with the digital signature.

At operation 1006, the processor 204 transmits the authenticated message to an adjacent node 404 to authenticate the source node 402 to the adjacent node 404. For example, the adjacent node 404 performs a verification process of the authentication message using a public key available to the adjacent node 404, an example of which is described in relation to FIG. 11.

Figure 11:
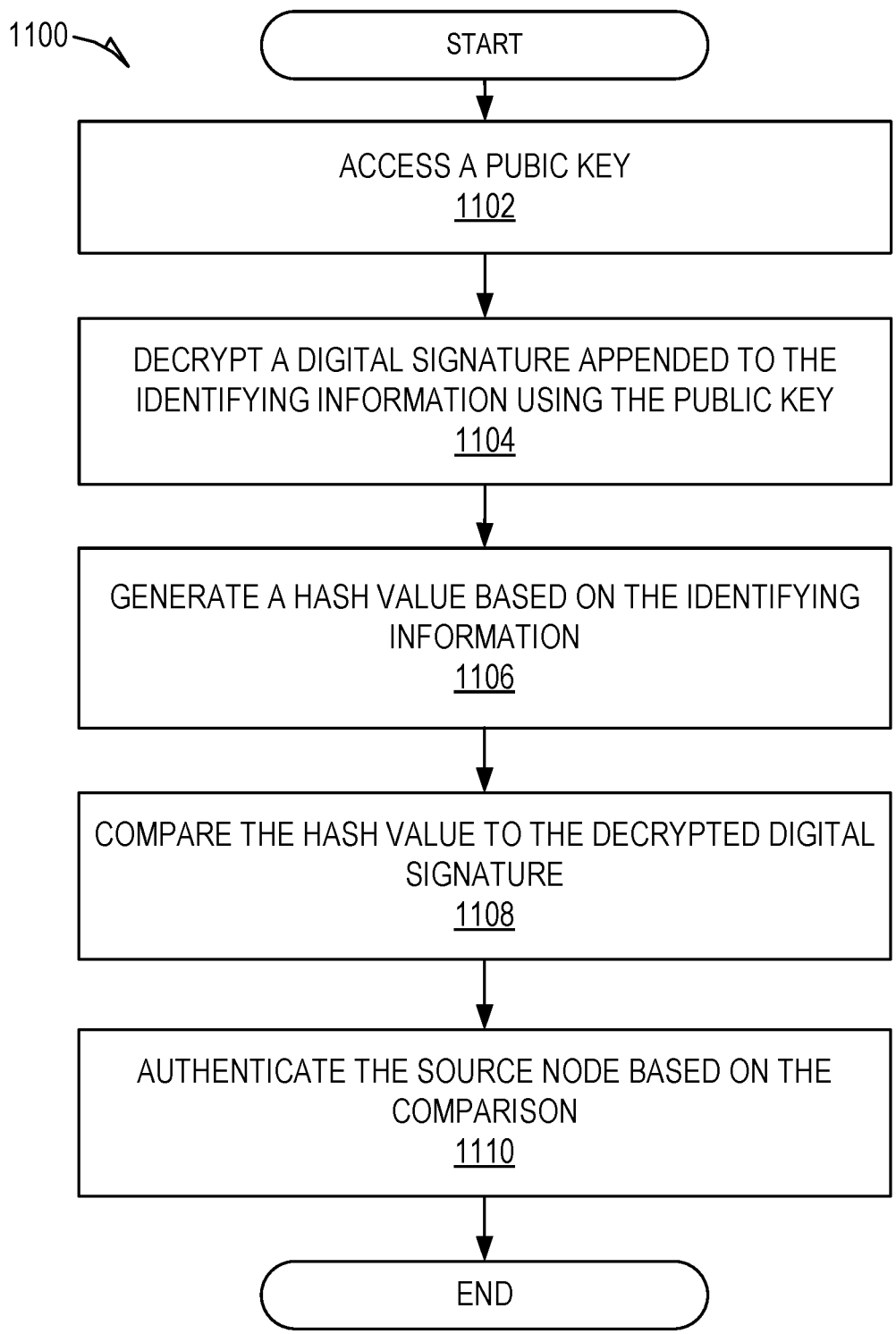
FIG. 11 is a flowchart showing a method of authenticating a source node, according to certain example embodiments.

FIG. 11 is a flowchart showing a method 1100 of authenticating a source node 402, according to certain example embodiments. The method 1100 may be embodied in computer readable instructions for execution by one or more processors such that the operations of the method 1100 may be performed in part or in whole by a adjacent node 404; accordingly, the method 1100 is described below by way of example with reference to an adjacent node 404. However, it shall be appreciated that at least some of the operations of the method 1100 may be deployed on various other hardware configurations and the method 1100 is not intended to be limited to an adjacent node 404.

At operation 1102, the adjacent node 404 accesses a public key. In some embodiments, the public key may be accessed from an OTP memory 208 of the adjacent node 404. Alternatively, in other embodiments, the public key may be accessed from a software image stored in a storage medium 206 of the adjacent node 404 that was authenticated during a secure boot of the adjacent node 404.

At operation 1104, the adjacent node 404 decrypts a digital signature appended to the identifying information using the public key. If the public key used to decrypt the digital signature corresponds to the private key used to generate the digital signature (e.g., the public key and the private key are a public/private key pair), the resulting decrypted digital signature will match the hash value used by the signing module 310 of the network security configuration system 302 when generating the digital signature. Alternatively, if the public key used to decrypt the digital signature does not correspond to the private key used to generate the digital signature, the resulting decrypted digital signature will not match the hash value used by the signing module 310 of the network security configuration system 302 when generating the digital signature.

At operation 1106, the adjacent node 406 generates a hash value based on the identifying information. For example, the adjacent node 406 may use the identifying information as input in the same hashing algorithm used by the network security configuration system 302 that generated the digital signature. Using the identifying information as input in the hashing algorithm provides a hash value that matches the hash value used by the signing module 310 of the network security configuration system 302 when generating the digital signature.

At operation 1108, the adjacent node 404 compares the hash value to the decrypted digital signature. For example, the adjacent node 404 compares the hash value to the decrypted digital signature to determine whether the hash value matches the decrypted digital signature.

At operation 1110, the adjacent node 404 authenticates the source node 402 based on the comparison. For example, the adjacent node 406 determines that the source node 402 is authenticated and/or trusted when the comparison indicates that the hash value matches the decrypted digital signature. Alternatively, the adjacent node 406 does not deem the source node 402 as being authenticated when the hash value is determined to not match the decrypted digital signature.

Software Architecture

Figure 12:
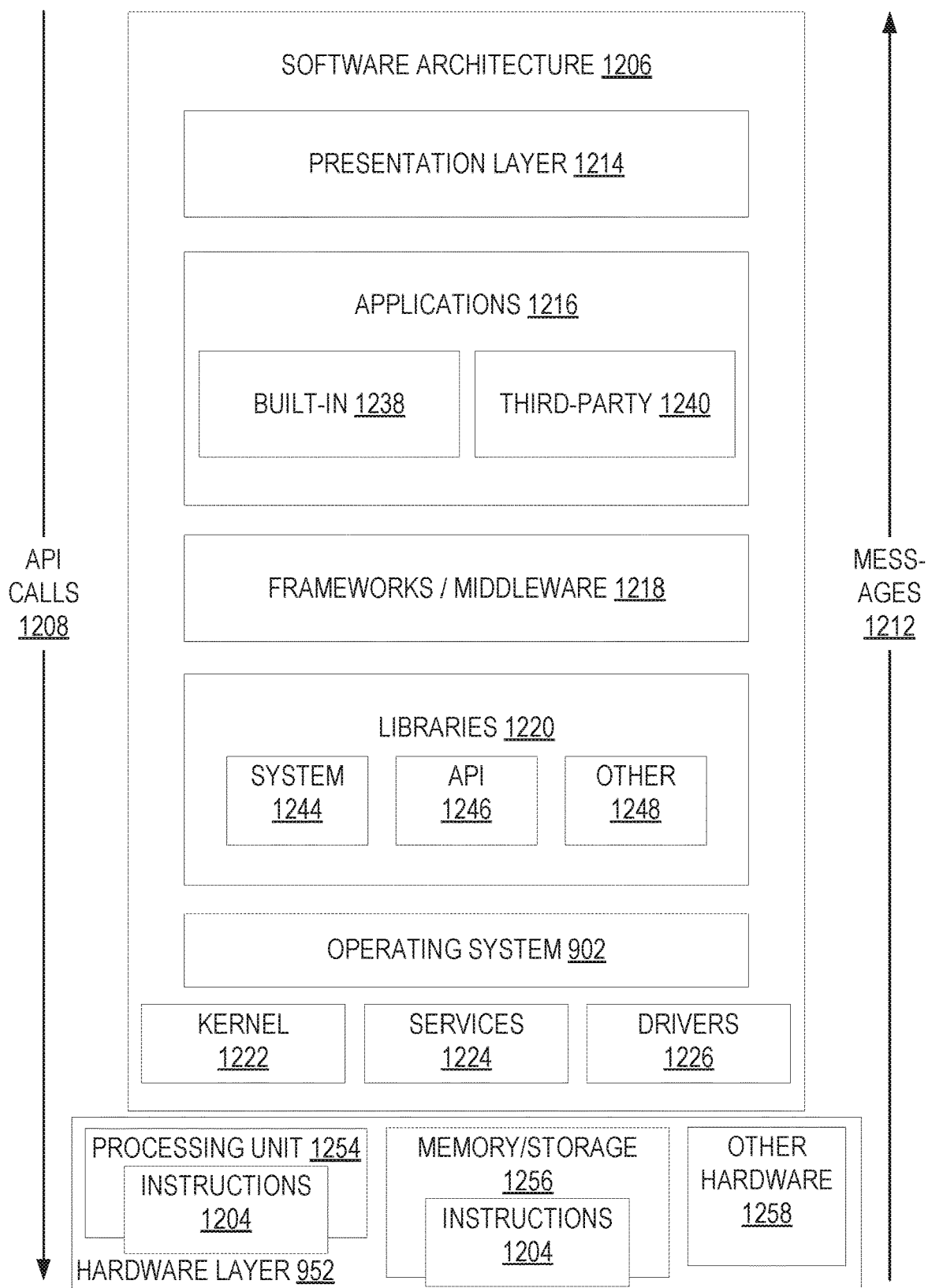
FIG. 12 is a block diagram illustrating an example software architecture, which may be used in conjunction with various hardware architectures herein described.

FIG. 12 is a block diagram illustrating an example software architecture 1206, which may be used in conjunction with various hardware architectures herein described. FIG. 12 is a non-limiting example of a software architecture 1206 and it will be appreciated that many other architectures may be implemented to facilitate the functionality described herein. The software architecture 1206 may execute on hardware such as machine 1300 of FIG. 13 that includes, among other things, processors 1304, memory 1314, and (input/output) I/O components 1318. A representative hardware layer 1252 is illustrated and can represent, for example, the machine 1300 of FIG. 13. The representative hardware layer 1252 includes a processing unit 1254 having associated executable instructions 1204. Executable instructions 1204 represent the executable instructions of the software architecture 1206, including implementation of the methods, components, and so forth described herein. The hardware layer 1252 also includes memory and/or storage modules 1256, which also have executable instructions 1204. The hardware layer 1252 may also comprise other hardware 1258.

In the example architecture of FIG. 12, the software architecture 1206 may be conceptualized as a stack of layers where each layer provides particular functionality, such as the Open Systems Interconnection model (OSI model). For example, the software architecture 1206 may include layers such as an operating system 1202, libraries 1220, frameworks/middleware 1218, applications 1216, and a presentation layer 1214. Operationally, the applications 1216 and/or other components within the layers may invoke application programming interface (API) calls 1208 through the software stack and receive a response such as messages 1212 in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphical user interface (GUI) functions, high-level resource management, high-level location services, and so forth. The frameworks/middleware 1218 may provide a broad spectrum of other APIs that may be used by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built in operating system functions (e.g., kernel 1222, services 1224, and/or drivers 1226), libraries 1220, and frameworks/middleware 1218 to create UIs to interact with users of the system. Alternatively, or additionally, in some systems, interactions with a user may occur through a presentation layer, such as presentation layer 1214. In these systems, the application/component "logic" can be separated from the aspects of the application/component that interact with a user.

Figure 13:
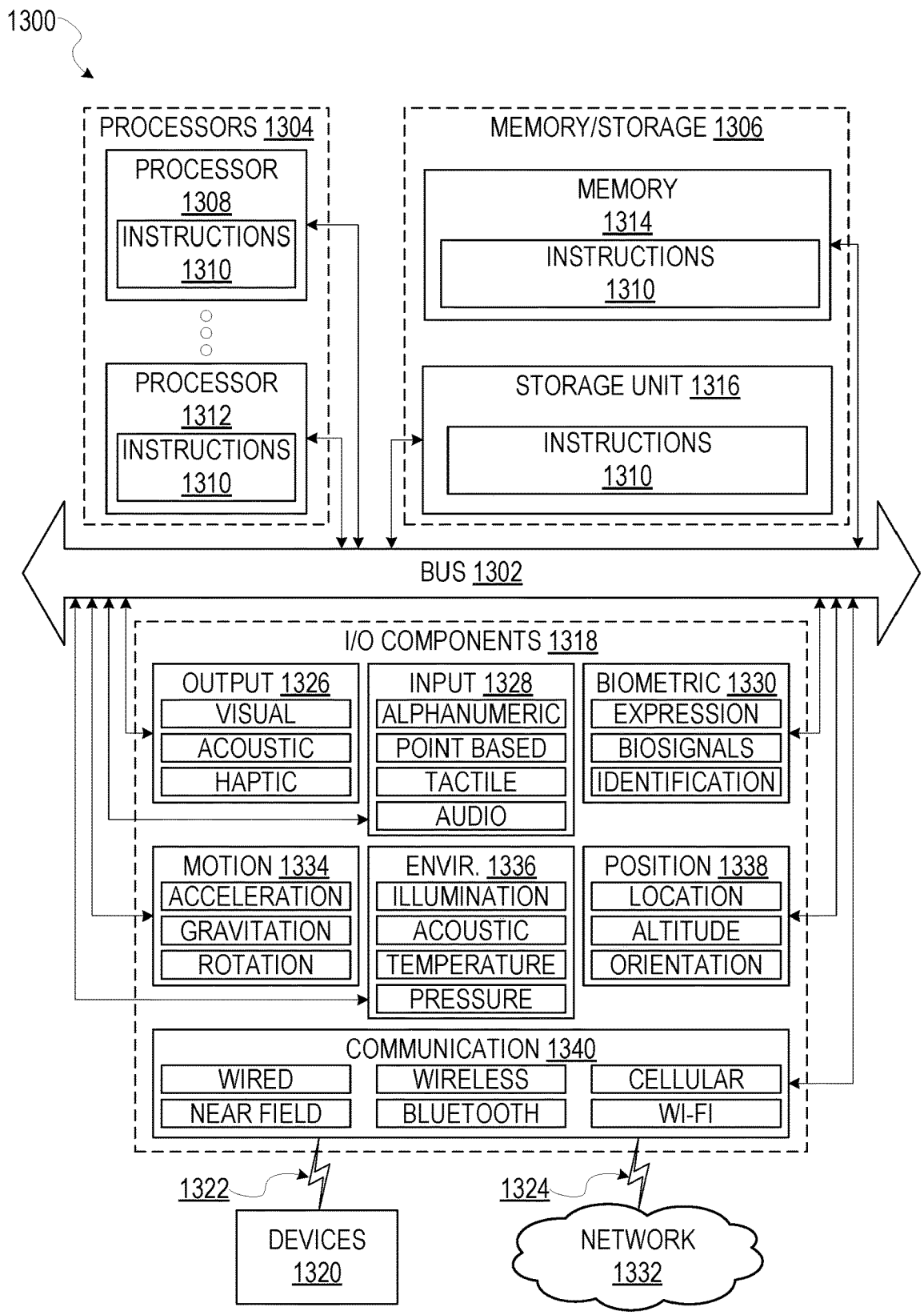
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions 1204 from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1300 capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1324 and coupling 1322, respectively. For example, the communication components 1340 may include a network interface component or other suitable device to interface with the network 1332. In further examples, communication components 1340 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1310 for execution by the machine 1300, and includes digital or analog communications signals or other intangible medium to facilitate communication of such instructions 1310. Instructions 1310 may be transmitted or received over the network 1332 using a transmission medium via a network interface device and using any one of a number of well-known transfer protocols.

"CLIENT DEVICE" in this context refers to any machine 1300 that interfaces to a communications network 1332 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1332.

"COMMUNICATIONS NETWORK" in this context refers to one or more portions of a network 1332 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1332 or a portion of a network 1332 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1310 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1310. The term "machine-readable medium" shall also be taken to include any medium, or combination of multiple media, that is capable of storing instructions 1310 (e.g., code) for execution by a machine 1300, such that the instructions 1310, when executed by one or more processors 1304 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1304) may be configured by software (e.g., an application 1216 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1304 or other programmable processor 1304. Once configured by such software, hardware components become specific machines 1300 (or specific components of a machine 1300) uniquely tailored to perform the configured functions and are no longer general-purpose processors 1304. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1304 configured by software to become a special-purpose processor, the general-purpose processor 1304 may be configured as respectively different special-purpose processors (e.g., comprising different hardware components) at different times. Software accordingly configures a particular processor or processors 1304, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1302) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1304 that are temporarily configured (e.g., by software) or permanently configured to perform the relevant operations. Whether temporarily or permanently configured, such processors 1304 may constitute processor-implemented components that operate to perform one or more operations or functions described herein. As used herein, "processor-implemented component" refers to a hardware component implemented using one or more processors 1304. Similarly, the methods described herein may be at least partially processor-implemented, with a particular processor or processors 1304 being an example of hardware. For example, at least some of the operations of a method may be performed by one or more processors 1304 or processor-implemented components. Moreover, the one or more processors 1304 may also operate to support performance of the relevant operations in a "cloud computing" environment or as a "software as a service" (SaaS). For example, at least some of the operations may be performed by a group of computers (as examples of machines 1300 including processors 1304), with these operations being accessible via a network 1332 (e.g., the Internet) and via one or more appropriate interfaces (e.g., an API). The performance of certain of the operations may be distributed among the processors 1304, not only residing within a single machine 1300, but deployed across a number of machines 1300. In some example embodiments, the processors 1304 or processor-implemented components may be located in a single geographic location (e.g., within a home environment, an office environment, or a server farm). In other example embodiments, the processors 1304 or processor-implemented components may be distributed across a number of geographic locations.

"PROCESSOR" in this context refers to any circuit or virtual circuit (a physical circuit emulated by logic executing on an actual processor 1304) that manipulates data values according to control signals (e.g., "commands," "op codes," "machine code," etc.) and which produces corresponding output signals that are applied to operate a machine 1300. A processor 1304 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1304 may further be a multi-core processor having two or more independent processors 1304 (sometimes referred to as "cores") that may execute instructions 1310 contemporaneously.

What is claimed is:

1. A method comprising:
   receiving, by a first node in a vehicle networking system, an authentication message from a second node in the vehicle networking system, the authentication message including a software component that comprises identifying information of the second node and a first digital signature that is appended to the identifying information to sign the identifying information, the second node having accessed the software component from a first source image that is signed using a first private key, that is authenticated by the second node using a first public key available to the second node, and accessed by the second node during a secure boot of the second node, the first digital signature having been generated by the second node using the first private key and the identifying information;
   accessing the first public key available to the first node; and
   authenticating the second node by:
      decrypting the first digital signature using the first public key to generate a decrypted first digital signature;
      generating a hash value using the identifying information of the second node; and
      authenticating the second node in response to the hash value matching the decrypted first digital signature.

2. The method of claim 1, wherein the first node accesses the first public key from a one-time programmable (OTP) memory of the first node.

3. The method of claim 1, wherein the first node accesses the first public key from a second source image authenticated during a secure boot of the first node.

4. The method of claim 1, further comprising:
   executing a secure boot of the first node;
   accessing, from a second source image authenticated during the secure boot of the first node, identifying information of the first node signed with a second digital signature, the second digital signature having been generated using a second private key;

generating a second authentication message including the second identifying information signed with the second digital signature; and transmitting the second authentication message to a third node in the vehicle networking system, the third node authenticating the first node based on the second digital signature and a second public key available to the third node.

5. The method of claim 4, wherein executing the secure boot of the first node comprises:

accessing the second source image, the second source image signed with a third digital signature, the third digital signature having been generated using a third private key;

accessing a third public key from a one-time programmable (OTP) memory of the first node; and authenticating the second source image based on the third digital signature and the third public key.

6. The method of claim 1, further comprising:

receiving a second authentication message from a third node in the vehicle networking system, the second authentication message including identifying information of the third node signed with a second digital signature;

accessing the first public key available to the first node; and determining that the third node is not authenticated based on the first public key and the second digital signature.

7. The method of claim 1, wherein a manufacturer of the second node signs the identifying information of the second node using the first private key, the manufacturer having generated a first key pair including the first private key and the first public key.

8. The method of claim 1, wherein a manufacturer signs the first source image using the first private key.

9. The method of claim 4, wherein a manufacturer of the first node generates a second key pair including the second private key and a second public key.

10. The method of claim 1, further comprising:

after authenticating the second node, utilizing a network data security tool to secure a network data link or path connecting the first node and the second node.

11. The method of claim 10, wherein the network data security tool is one of Media Access Control Security and IP Security (IPSec).

12. A first node in a vehicle networking system, the first node comprising:

one or more computer processors; and one or more computer-readable mediums storing instructions that, when executed by the one or more computer processors, cause the first node to perform operations comprising:

receiving an authentication message from a second node in the vehicle networking system, the authentication message including a software component that comprises identifying information of the second node and a first digital signature that is appended to the identifying information to sign the identifying information, the second node having accessed the software component from a first source image that is signed using a first private key, that is authenticated by the second node using a first public key available to the second node, and accessed by the second node during a secure boot of the second node, the first digital signature having been generated by the second node using the first private key and the identifying information;

accessing the first public key available to the first node; and authenticating the second node by:

decrypting the first digital signature using the first public key to generate a decrypted first digital signature;

generating a hash value using the identifying information of the second node; and authenticating the second node in response to the hash value matching the decrypted first digital signature.

13. The first node of claim 12, wherein the first node accesses the first public key from a one-time programmable (OTP) memory of the first node.

14. The first node of claim 12, wherein the first node accesses the first public key from a second source image authenticated during a secure boot of the first node.

15. The first node of claim 12, the operations further comprising:

executing a secure boot of the first node;

accessing, from a second source image authenticated during the secure boot of the first node, identifying information of the first node signed with a second digital signature, the second digital signature having been generated using a second private key;

generating a second authentication message including the second identifying information signed with the second digital signature; and transmitting the second authentication message to a third node in the vehicle networking system, the third node authenticating the first node based on the second digital signature and a second public key available to the third node.

16. The first node of claim 15, wherein executing the secure boot of the first node comprises:

accessing the second source image, the second source image signed with a third digital signature, the third digital signature having been generated using a third private key;

accessing a third public key from a one-time programmable (OTP) memory of the first node; and authenticating the second source image based on the third digital signature and the third public key.

17. The first node of claim 12, the operations further comprising:

receiving a second authentication message from a third node in the vehicle networking system, the second authentication message including identifying information of the third node signed with a second digital signature;

accessing the first public key available to the first node; and determining that the third node is not authenticated based on the first public key and the second digital signature.

18. The first node of claim 12, wherein a manufacturer of the second node signs the identifying information of the second node using the first private key, the manufacturer having generated a first key pair including the first private key and the first public key.

19. The first node of claim 12, wherein a manufacturer signs the first source image using the first private key.

20. A non-transitory computer-readable medium storing instructions that, when executed by one or more computer processors of a first node in a vehicle networking system, cause the first node to perform operations comprising:

receiving an authentication message from a second node in the vehicle networking system, the authentication message including a software component that comprises identifying information of the second node and a first digital signature that is appended to the identifying information to sign the identifying information, the second node having accessed the software component from a first source image that is signed using a first private key, that is authenticated by the second node using a first public key available to the second node, and accessed by the second node during a secure boot of the second node, the first digital signature having been generated by the second node using the first private key and the identifying information;

accessing the first public key available to the first node; and authenticating the second node by:

decrypting the first digital signature using the first public key to generate a decrypted first digital signature;

generating a hash value using the identifying information of the second node; and authenticating the second node in response to the hash value matching the decrypted first digital signature.

\* \* \* \* \*